United States Patent [19]
Buening

[11] Patent Number: 5,542,214
[45] Date of Patent: Aug. 6, 1996

[54] FLUSH-CLOSING MULTI-PANE WINDOW ASSEMBLY FOR MOTOR VEHICLES

[75] Inventor: Dennis J. Buening, Waterford, Mich.

[73] Assignee: Excel Industries, Inc., Elkhart, Ind.

[21] Appl. No.: 369,345

[22] Filed: Jan. 6, 1995

[51] Int. Cl.⁶ ........................................ E06B 1/00
[52] U.S. Cl. ................. 49/380; 49/127; 49/130; 49/360
[58] Field of Search ............................ 49/380, 127, 130, 49/128, 129, 360; 52/207

[56] References Cited

U.S. PATENT DOCUMENTS

| | | | |
|---|---|---|---|
| 2,992,460 | 7/1961 | Hentges | 49/130 |
| 4,384,429 | 5/1983 | Rokicki et al. | 49/130 |
| 4,561,224 | 12/1985 | Jelens | 49/130 X |
| 4,850,139 | 7/1989 | Tiesler . | |
| 4,920,698 | 5/1990 | Friese et al. . | |
| 4,995,195 | 2/1991 | Olberding | 49/380 X |
| 5,345,717 | 9/1994 | Mori et al. | 49/380 X |

FOREIGN PATENT DOCUMENTS

| | | | |
|---|---|---|---|
| 452535 | 8/1936 | United Kingdom | 49/130 |

*Primary Examiner*—Philip C. Kannan
*Attorney, Agent, or Firm*—Banner & Allegretti, Ltd.

[57] ABSTRACT

A flush-closing multi-pane window assembly for a motor vehicle is provided, comprising a frame for mounting in a window recess in the vehicle body, one or more fixed-position panes mounted to the frame and at least one sliding pane mounted to the frame for sliding between an open position and a closed position. In its open position, the sliding pane overlaps a fixed-position pane, but in its closed position is substantially flush therewith. Guide means are provided for guiding the sliding pane as it moves laterally between its open and closed position. The guide means includes fixed members extending from the sliding panes substantially perpendicular to its direction of travel and kick-out means provided by the frame for engaging the fixed members at least during initial lateral movement of the sliding pane from its closed position to its open position. The kick-out means engages the fixed members to force the sliding pane from the plane flush with that of the fixed-position pane to the offset parallel plane substantially simultaneously with such initial lateral movement of the sliding pane from its closed position.

13 Claims, 7 Drawing Sheets

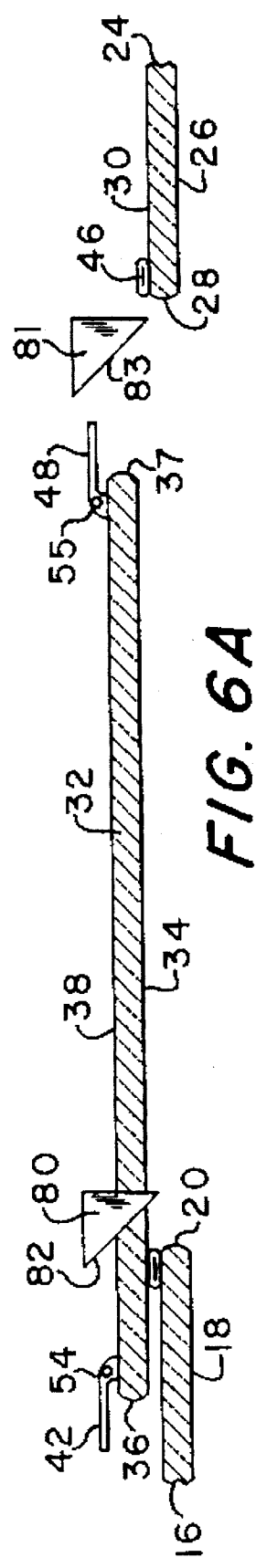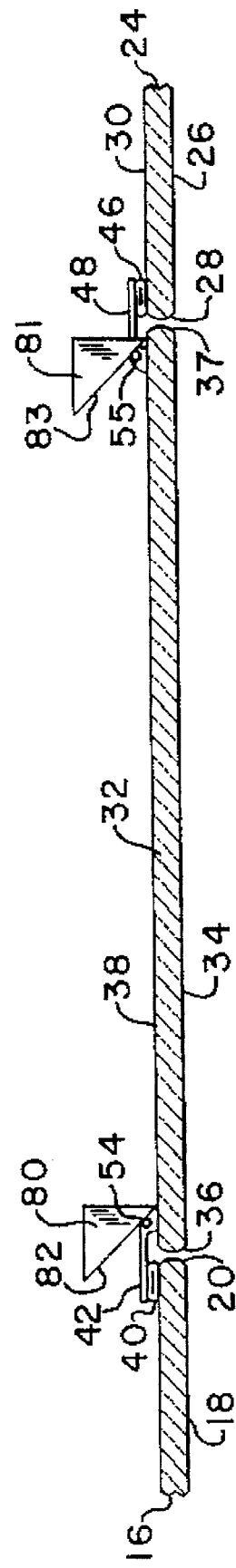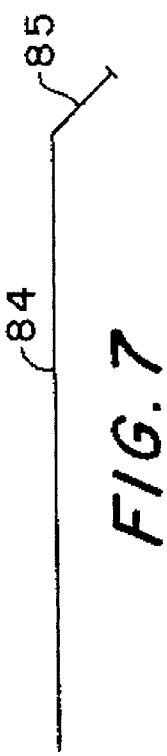

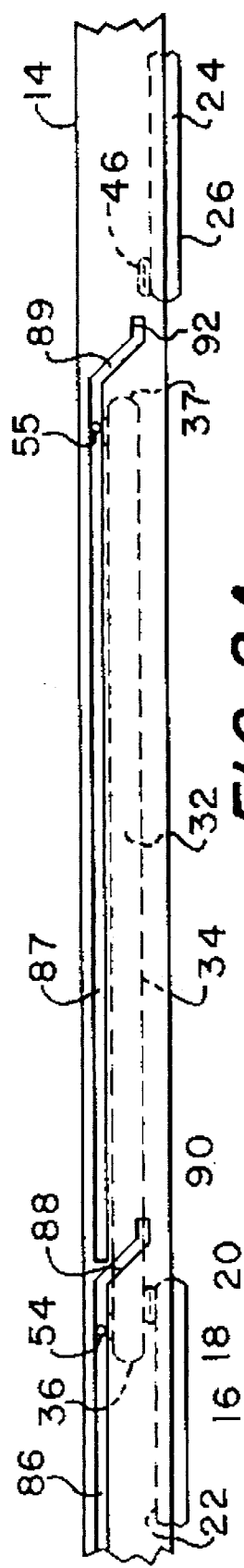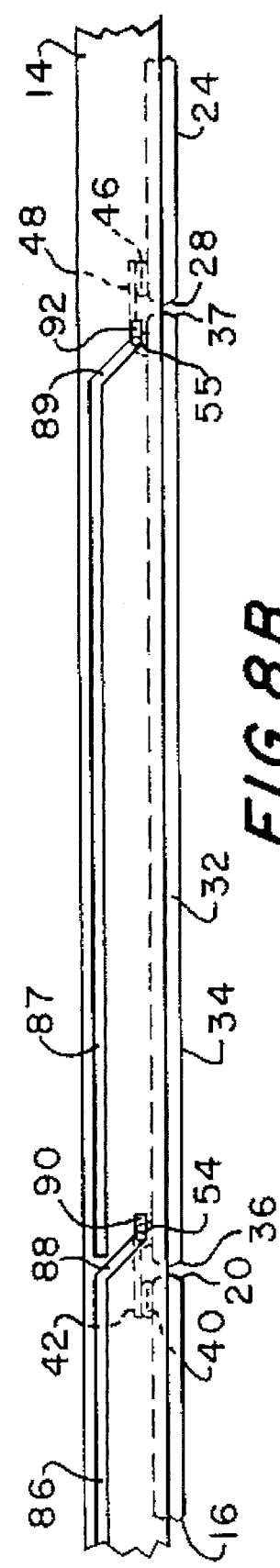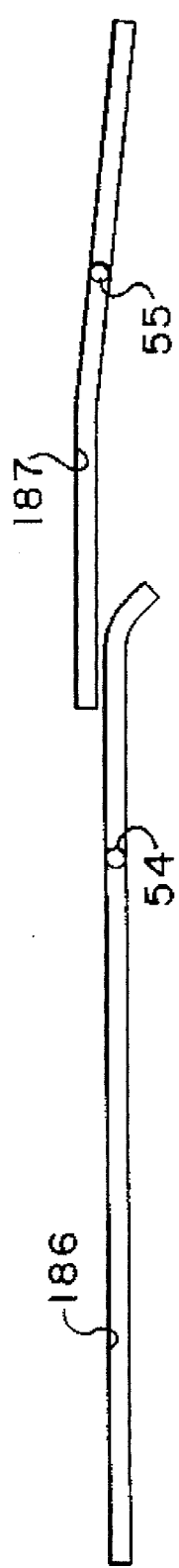

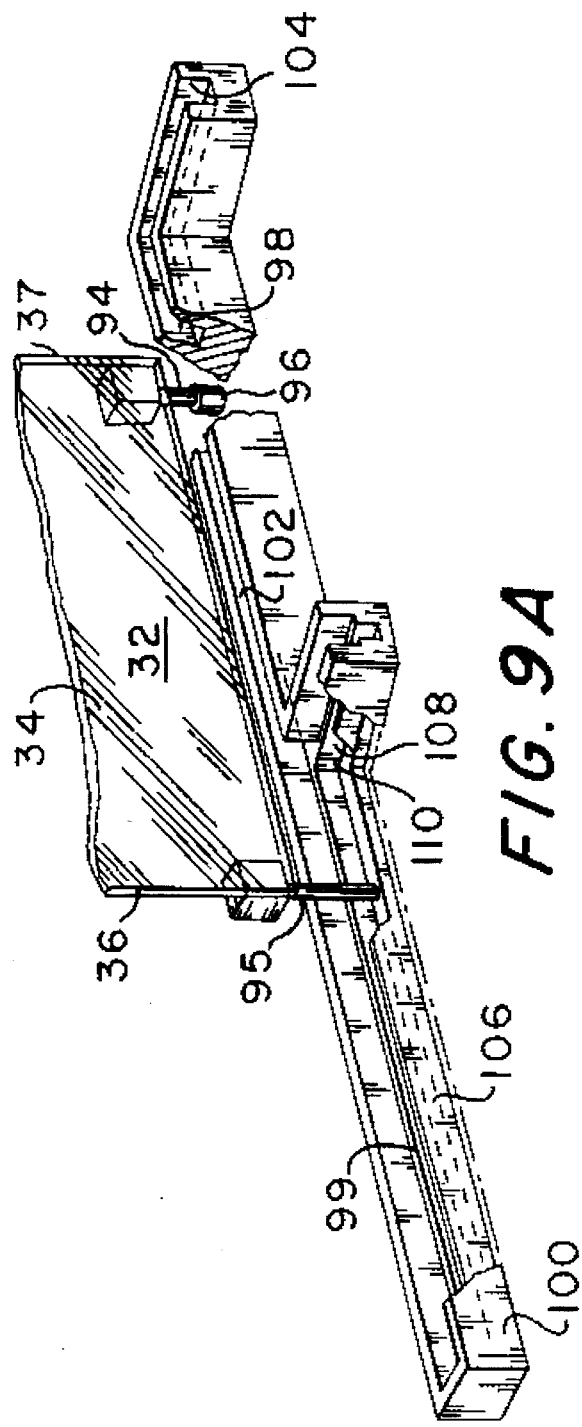
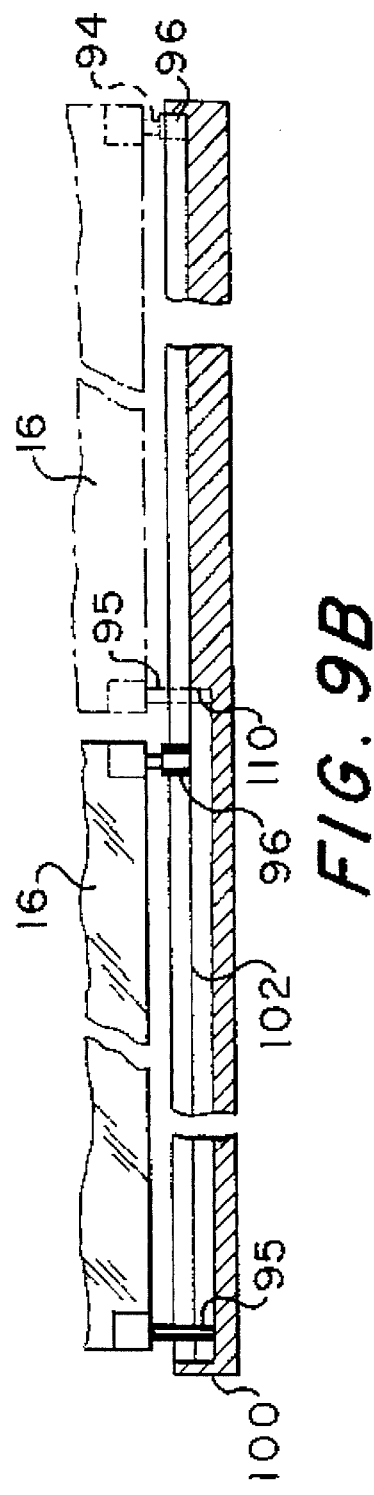

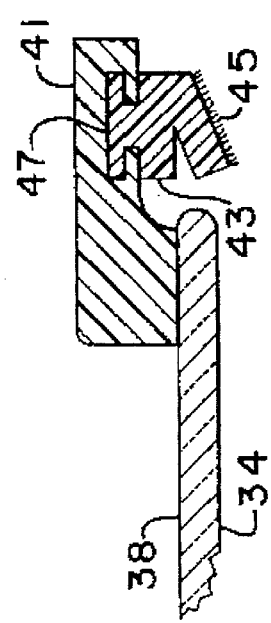
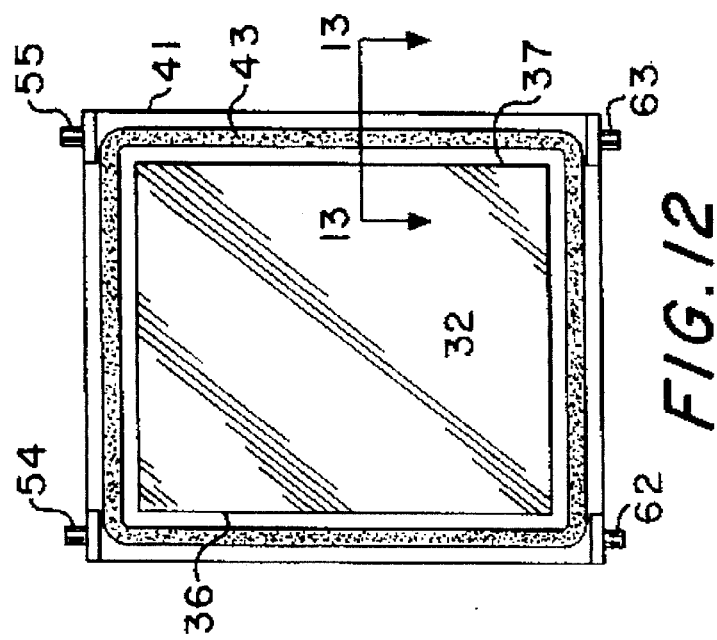
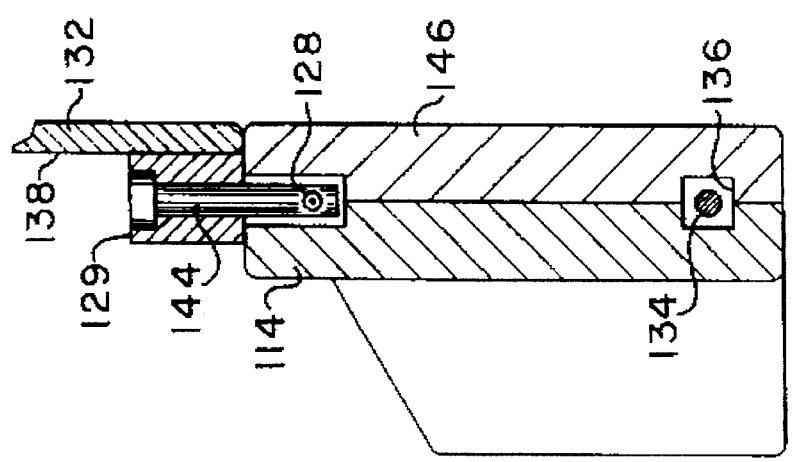

FLUSH-CLOSING MULTI-PANE WINDOW ASSEMBLY FOR MOTOR VEHICLES

INTRODUCTION

The present invention is directed to a multi-pane window assembly for a motor vehicle and, more particularly, to a window assembly in which a sliding pane in its closed position is substantially flush with one or more adjacent fixed-position panes and, in its open position, overlaps the fixed-position pane in an offset, parallel plane.

BACKGROUND

Multi-pane window assemblies are frequently preassembled prior to installation in motor vehicles. Preassembly for simple insertion into a window opening in the vehicle body during vehicle assembly has been found to yield substantial cost and quality advantages. Such window assemblies typically include a metal or plastic frame to which the glass or plastic panes are mounted. The frame may be formed in place around the perimeter of the transparent panes. Such window assemblies intended for use as rear windows for pickup truck cabs, for example, typically include a frame holding one or more fixed panes and a sliding pane.

As the exterior surfaces of vehicles, including pickup trucks and the like, have grown progressively smoother and more aerodynamic, a need has developed for window assemblies suitable to present a correspondingly more integrated and flush appearance. In particular, it has become desirable to provide multi-pane window assemblies wherein at least one pane is slidable mounted, which can be integrated into a recessed window opening to provide a substantially flush overall appearance.

Preassembled multi-pane window assemblies are known, such as shown in U.S. Pat. No. 4,920,698 to Friese et al. The Friese et al window assemblies are for mounting in the rear window of a truck cab as a replacement for the OEM (original equipment manufacturer) window assembly originally included in the vehicle when it was new. The Friese et al window assembly includes right and left side fixed panes and a sliding center pane powered by an electric motor. In the powered sliding truck cab window assembly of Friese et al, however, the center pane is not flush with the side panes. Rather it is recessed in toward the passenger compartment of the truck, such that it can slide laterally behind one or the other of the fixed panes to open the window. Thus, the center sliding pane does not contribute to an overall flush appearance. A window assembly for a vehicle having a flush sliding pane is shown in U.S. Pat. No. 4,850,139 to Tiesler. In the Tiesler design the sliding window is manually operated and slides in slots having wider-width portions. The wider-width portion of the slot is provided to permit one side of the sliding pane to be pulled manually out of flushness with the adjacent fixed pane and thereafter slid laterally behind the adjacent fixed pane. When the sliding pane of Tiesler et al is in its closed position, the side which is in the wider-width portion of the slot must be locked in its closed position. If the slider is left unlocked in its closed position, it would be free to shift position and rattle due to its one side being unconstrained. That is, the side which is in the wider-width portion of the travel slot would be free to shift to-and-fro within that wider space. Current motor-vehicle design requirements make it undesirable to have sliding panes which are free to shift or rattle in such fashion. Rather, it would be highly desirable to provide a preassembled window assembly having fixed and sliding panes, wherein the sliding pane(s) in its closed position is fully flush with the adjacent fixed pane(s), but nevertheless slides behind one of the adjacent fixed panes, while at all times being constrained as to its position within tolerances suitable to permit smooth sliding.

It would be particularly desirable to provide such a sliding window assembly in which the sliding pane could optionally be power driven by a simple, reliable power drive means. In the window assembly of the Tiesler patent, by comparison, no power drive means is suggested, and the complexity of first pulling one side of the window out of flushness followed by delayed lateral sliding would require a correspondingly complicated drive mechanism with consequent cost and reliability disadvantages.

It is an object of the present invention to provide multi-pane modular window assemblies having fixed and slidable mounted panes, presenting a substantially flush overall appearance. For motor vehicles, improved window assemblies with slidable panes are needed, which are preassembled prior to installation in the window opening, particularly as the rear window of the cab portion of a pickup truck vehicle body. It is an object of the present invention to provide such window assemblies having a sliding pane, integrated with one or more fixed panes, which are readily preassembled and are suitable for meeting the strict fit and finish requirements of motor vehicle glazing applications. Additional objects and features of the invention will be apparent from the following disclosure and detailed discussion of preferred embodiments.

SUMMARY

In accordance with a first aspect, a flush-closing multi-pane window assembly for a motor vehicle has a frame for mounting in a window recess in the vehicle body, comprising at least one structurally self-supporting frame member. Typically, a full-circumference frame member, optionally with intermediate bridging portions, is provided as a single unitary member formed by reaction injection molding or other plastic molding technique. Various brackets, cover plates, fixturing devices and the like, generally will be mounted to such unitary frame member. At least one fixed-position pane is mounted to the frame, as well as at least one sliding pane. The sliding pane is mounted for sliding between an open position and a closed position in which it sits in a plane flush with that of the fixed-position pane. That is, in its closed position the outside surface of the sliding pane is substantially flush with the outside surface of the fixed-position pane. In its open position the sliding pane lies in an offset second plane substantially parallel to the first plane and substantially overlapping the fixed-position pane. Guide means are provided for guiding the sliding pane as it moves between its open and closed positions, at all times being constrained fore- and-aft within tolerances suitable to permit smooth sliding. The guide means comprises kick-out means for forcibly guiding the sliding pane from the first plane toward the second plane substantially simultaneously with the initial lateral movement of the sliding pane from its closed position toward its open position.

The guide means preferably comprises guide channels provided either by the frame or the sliding pane, and fixed pins or the like mounted to the other of the frame and sliding pane and extending into the guide channels. The kick-out means is preferably then provided as a feature or apparatus to interact with the fixed pins as the sliding pane is moved.

Such kick-out means preferably may comprise, for example, ramp surfaces, optionally forming a portion of the guide channel surface, movably mounted cams and the like.

It is a significant advantage provided by the flush-closing multi-pane window assemblies disclosed here that the sliding pane is forcibly guided from its flush, closed position toward its offset, open position in a parallel plane substantially simultaneously with initial movement of the sliding pane from its closed position. This feature, in cooperation with others of the novel window assemblies, permits the sliding pane to be constrained at least in a direction normal to the flush plane at all points along the sliding pane's path of travel between its open and closed positions. Furthermore, the window assembly is readily adapted to be used in conjunction with drive means, such as a hand crank or, more preferably, an electric motor actuated from within the passenger compartment. Drive force can be provided to push or pull the sliding pane along a single defined path of travel without the need for first pulling the sliding pane out of its flush plane prior to initiation of lateral sliding. Considerable simplification is thus achieved in designing drive means for the window assembly, with consequent cost savings and increased reliability.

It is an additional advantage that novel window assemblies disclosed here can be mounted into a recessed window opening in a motor vehicle body to provide an appearance of being substantially flush with the sheet metal or other vehicle body panels surrounding the window opening. Unitary weather seals, such as disclosed in commonly-owned U.S. Pat. No. 5,154,028, can be provided as a radially outward extension of the frame to abut sidewalls of the motor vehicle window recess. As used here, any plane or surface which lies in a plane may be either flat or curvoplaner, as that term is understood by those who are skilled in the art, that is, by those who are knowledgeable regarding this area of technology. The exterior surface of the sliding pane will be considered substantially flush with that of an adjacent fixed pane in the window assembly if it follows a common curved plane. Such surfaces also are substantially flush, as that term is used here, if they have a generally flush appearance within the standards of the motor vehicle manufacturer. Thus, for example, in the case of a pickup truck rear window assembly, the exposed exterior surface of the sliding pane will be substantially flush with the curvoplaner surface of adjacent fixed-position panes, if it is within about one centimeter or, more preferably, one-half centimeter, most preferably within about two millimeters, of an imaginary extension of the curved plane of the fixed-position panes. More generally, substantially flush means that the exterior surface of the sliding pane meets the specifications of the motor vehicle manufacturer for a substantially flush appearance for the intended application of the window assembly.

Additional features and advantages of various preferred embodiments will be better understood from the following detailed discussion.

Directional references used herein will, for convenience of description, assume a window assembly mounted as the rear window in the cab or passenger compartment of a motor vehicle, such as a pickup truck or the like. Thus, an interior surface of the window faces into the passenger compartment. An exterior surface faces rearward of the vehicle. The lateral directions are right and left as one faces from the back to the front of the vehicle.

BRIEF DESCRIPTION OF THE DRAWINGS

Certain preferred embodiments are described in detail below with reference to the appended drawings wherein:

FIGS. 6A and 6B are schematic sectional views of the fixed-position panes and center sliding pane of the window assembly of FIGS. 1–3, illustrating a second alternative embodiment of the guide means for guiding the sliding pane as it moves between its open position (FIG. 6A) and its closed position (FIG. 6B);

FIG. 7 shows the path of travel followed by the sliding pane of the embodiment of FIGS. 6A and 6B as it moves between its open and closed positions;

FIGS. 8A and 8B are schematic views, partially in section and partially broken away, of the fixed-position panes and center sliding pane of the window assembly of FIGS. 1–3, illustrating a third alternative embodiment of the guide means for guiding the sliding pane as it moves between its open position (FIG. 8A) and closed position (FIG. 8B);

FIG. 8C shows the path of travel followed by the sliding pane of the embodiment of FIGS. 8A and 8B as it moves between its open and closed positions;

FIG. 9A is a schematic perspective view, partially in section and partially broken away, showing another alternative embodiment of the guide means for the window assembly of FIGS. 1–3;

FIG. 9B is a schematic elevation view, partially in section and partially broken away, of the embodiment of FIG. 9A;

FIG. 11 is a section view taken through lines 11—11 of FIG. 10, illustrating features of the cable drive means;

FIG. 12 is a schematic elevation view of a sliding pane sub-assembly in accordance with an alternative preferred embodiment; and FIG. 13 is an enlarged section view taken through lines 13—13 of FIG. 12.

Figure 1:
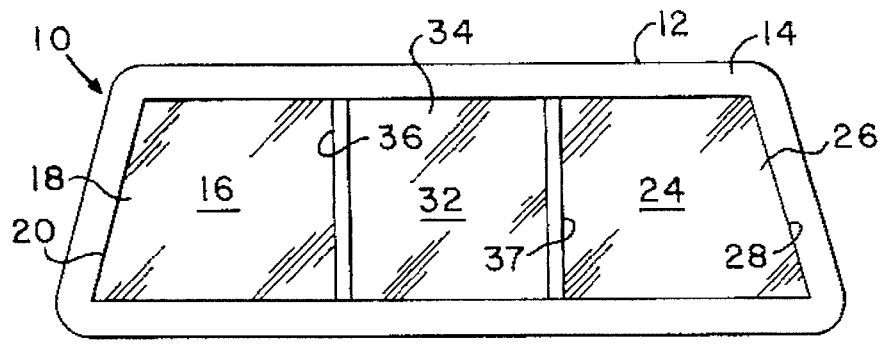
FIG. 1 is a schematic elevation view of a window assembly incorporating a sliding pane in accordance with a first preferred embodiment.

The figures referred to above are not drawn necessarily to scale and should be understood to present a simplified representation of the invention, illustrative of the basic principles involved. The same reference numbers are used in the drawings for similar or identical components and features shown in various alternative embodiments. Window assemblies incorporating flush sliders as disclosed above, will have configurations and components determined, in part, by the intended application and use environment. Some features of the window assembly depicted in the accompanying figures have been enlarged or distorted relative to others to facilitate visualization and understanding. In particular, for example, thin features may be thickened and long features may be shortened. Consistent with the description of directional references provided above, "forward" means toward the front of the vehicle, "rearward" means toward the rear of the vehicle, "right-side" means the passenger side of the vehicle (for vehicles intended for a left-drive vehicle market, such as the United States, and vice versa for vehicles intended for right-drive vehicle markets, such as the United Kingdom); "outward" or "exterior" refers to a direction or position outwardly of the passenger compartment; and "inward" or "interior" refers to a direction toward or into the passenger compartment of the vehicle.

DETAILED DESCRIPTION OF CERTAIN PREFERRED EMBODIMENTS

The novel finish-closing multi-pane window assemblies disclosed here can have one or more fixed panes and one or more sliding panes. The window assembly can be configured for use as a truck cab backlite, as a mother vehicle sidelite etc. The sliding pane(s) can slide up and down, side-to-side, etc., and can be adapted to slide manually, for example, by means of a bracket or handle affixed directly to the sliding pane, or to be remotely driven by electric motor, hand crank, etc., using push/pull cables or pull/pull cable arrangements between the sliding pane and the drive means. The detailed discussion below will focus primarily on embodiments of the window assembly intended for use as a pickup truck backlite with a single center sliding pane between right- and left-side fixed-position panes. In view of this discussion and disclosure, those who are skilled in the art will be readily able to apply its general principles in alternative motor vehicle applications, such as motor vehicle sidelites, window assemblies with vertically sliding panes, etc.

Figure 2:
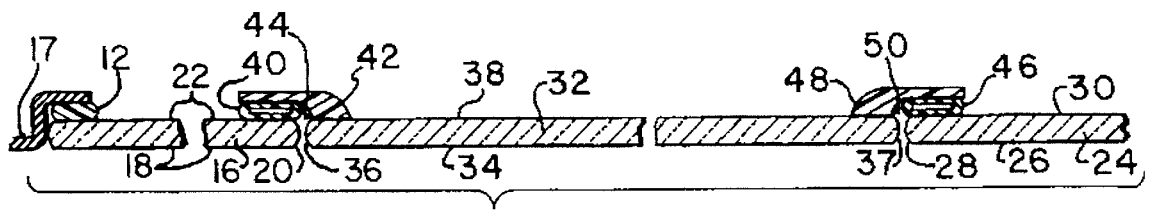
FIG. 2 is an enlarged section view showing the relative positioning of the fixed-position panes of the window assembly of FIG. 1, together with the center sliding pane in its closed position, along with selected other componentry of the assembly.
Figure 3:
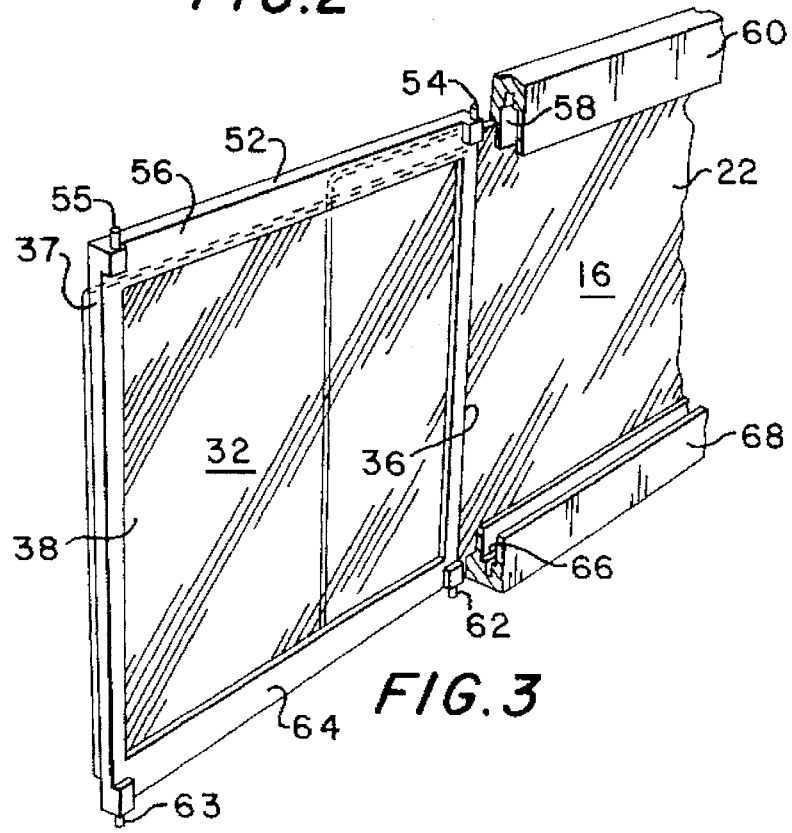
FIG. 3 is a schematic interior perspective view, partially broken away, of a window assembly in accordance with an alternative preferred embodiment.

Referring now to FIGS. 1–3, a window assembly 10 is seen to comprise a structurally self-supporting frame 12 which includes a full-circumference one-piece molded plastic frame member 14. The frame is full-circumference in the sense that it forms an unbroken ring of molded plastic material about the outer perimeter of the assembly. The continuous one-piece frame is advantageous in facilitating mounting and sealing with the window assembly into a recessed window opening in the motor vehicle body. A left-side fixed pane 16 is mounted to the frame 12. It has an exterior surface 18, a perimeter edge 20 and an inside surface 22. The exterior surface 18 of the fixed-position pane 16 is substantially flush with the vehicle body 17 surrounding the window recess, the exterior surface 18 and perimeter edge surface 20 of the fixed-position pane 16 being outward of the frame 12 and free of surface bonding to the frame 12. Similarly, right-side fixed pane 24 has an outer surface 26, a perimeter edge 28 and an inside surface 30. A center sliding pane 32 is mounted in the opening between the two fixed panes. Center sliding pane 32 has an exterior surface 34 which, as best seen in FIG. 2, is substantially flush with the exterior surfaces of the fixed panes when the sliding pane is in its closed position. It can be seen that the left-side vertical perimeter edge 36 of the sliding pane, in the closed position illustrated in FIG. 2, lies in alignment with, and in close proximity to, perimeter edge 20 of fixed pane 16. Similarly, right-side perimeter edge 37 of sliding pane 32 is aligned with and closely proximate to perimeter edge 28 of the right-side fixed pane 24.

Weather sealing can be provided at the upper and lower horizontal edges of sliding pane 32 in accordance with known techniques including, for example, the use of blade seals affixed to the frame 12, etc. In accordance with one preferred embodiment, weather sealing along the right- and left-side vertical edges of sliding pane 32 is provided by O-seals. Specifically, a left O-seal 40 is adhesively or otherwise affixed vertically to inside surface 22 of left-side fixed pane 16 at its periphery adjacent the sliding pane. A sealing flange 42 extends vertically along the periphery of inside surface 38 of sliding pane 32, and provides a sealing surface 44 which overlies, contacts and partially compresses O-seal 40. Similarly, another vertically-extending sealing flange 48 is affixed to the opposite periphery of the inside surface 38 of sliding pane 32, providing a sealing surface 50 which overlaps, contacts and partially compresses right-side O-seal 46, which is affixed along the vertical periphery of inside surface 30 of right-side fixed pane 24. An O-seal typically is provided as a length of resilient material having a round or oval cross section with an open center.

In an alternative preferred embodiment, a weather seal is provided as a single, substantially continuous, full-circumference blade seal mounted around the perimeter of the sliding pane. Most preferably, the sliding pane sub-assembly provides a single sealing flange, much like flanges 42 and 48 but which extends around the entire inside perimeter of the sliding pane 32. The sealing flange preferably is formed of molded plastic, such as PVC, RIM, etc., most preferably being molded in place directly onto the surface of the sliding pane in accordance with known techniques. As seen in FIGS. 12 and 13, full-circumference flange 41 extends beyond the perimeter of the glass 32 and carries full-circumference blade seal 43. The blade seal preferably is an extruded or otherwise molded member formed of natural or synthetic rubber, EPDM or other suitable material. It can be mounted as a single, continuous strip or in multiple pieces. Preferably its surface 45 which forms sealing contact with adjacent fixed panes or other surfaces of the window assembly is flocked in accordance with known techniques, to improve sliding contact as the sliding pane moves into and out of its closed position. The blade seal 43 can be mounted to the flange 41 in any suitable manner, including adhesively. In the preferred embodiment shown, blade seal 43 includes flanged mounting base 47 which slips into a correspondingly shaped recess in flange 41. This arrangement is found to provide ease of assembly and replacement. Alternative sealing materials and techniques will be readily apparent to those skilled in the art in view of the present disclosure.

The sliding pane optionally is provided as a subassembly comprising not only the transparent glazing panel of glass, plastic or a laminate thereof, but also a frame of molded plastic or the like extending partially or completely around the perimeter of the glazing panel. A subassembly of this type is illustrated in the alternative embodiment shown in FIG. 3. Thus, sliding pane 32 is shown in FIG. 3 to have perimeter rim frame 52. The left-side perimeter edge 36 of the sliding pane is provided as the exposed left-side vertical surface of rim frame 52. (This edge surface appears at the right side of sliding pane 32 in FIG. 3, since FIG. 3 is a view from inside the passenger compartment.) Similarly, the vertical right edge of rim frame 52 provides perimeter edge 37 of the sliding pane. Alternatively, the perimeter edge of glass may be retained in the sliding pane subassembly, as a "raw" edge, i.e., an exposed surface, as in FIGS. 12 and 13 for example. It will be well within the ability of those skilled in the art to employ features or components additional or alternative to those described herein. Locking means, for example, may be provided, such as locking latch means mounted on the inside surface of the sliding pane or elsewhere in the window assembly, or numerous other well known locking means may be employed.

As indicated above, it is a significant advantage of the present invention that guide means are provided for the sliding pane, comprising kick-out means for forcibly offsetting the sliding pane from its flush plane in its closed position toward a parallel plane substantially simultaneously with the initial lateral movement of the sliding pane toward its open position. Preferably, the guide means further comprises fixed members extending from the sliding pane or from the frame, and corresponding guide channels in the other of them, to receive the fixed members. The fixed members, most preferably, extend from the sliding pane, as in the embodiment illustrated in FIG. 3, and, correspondingly, the guide channels are provided in the frame. More specifically, sliding pane 32 is seen in FIG. 3 to have upper pins 54 and 55 (being left-side and right-side pins, respectively, as viewed from outside the vehicle) extending upwardly from upper horizontal member 56 of rim frame 52 into upper guide channel 58 in upper, horizontally-extending frame portion 60. Similarly, lower pins 62 and 63 extend downwardly below the sliding pane 32 from a lower horizontal portion 64 of rim frame 52, into a lower guide channel 66 provided in a horizontally-extending lower frame portion 68. The pins preferably are spring loaded or otherwise biased in the vertical direction to reduce or eliminate window rattle. Only the top pins or, more preferably, the bottom pins need be biased. This preferred feature is found to aid also in simplifying the assembly and disassembly of the window, by permitting the pins to be retracted to enter or escape the guide channels. It can be seen that the guide channel are formed simply as a recess in the frame members. Alternatively, auxiliary brackets or appliques may be added to the frame to form the guide channels, perhaps in cooperation with the main body of the frame. Also, channel liners, such as U-shaped inserts, may be used to more easily control sliding friction, channel dimensions, etc. Also, as noted above blade seals and other known components may be added.

Figure 4A:
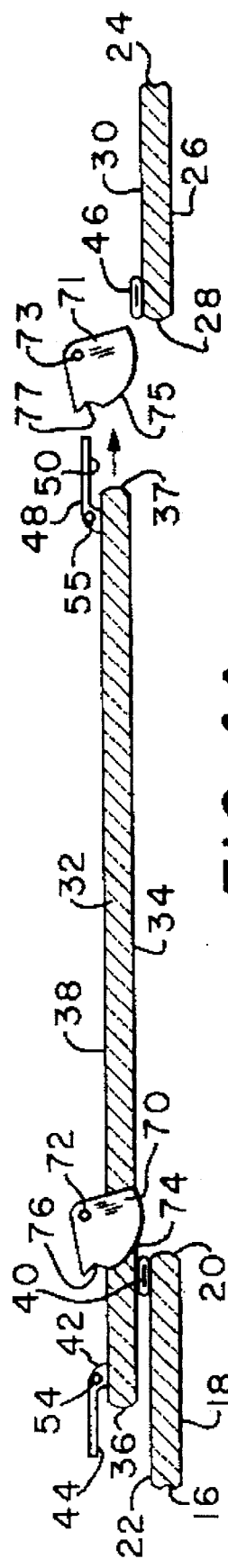
FIGS. 4A and 4B are schematic sectional views of the fixed-position panes and center sliding pane of the window assembly of FIGS. 1–3, illustrating a first alternative embodiment of the guide means for guiding the sliding pane as it moves between its open position (FIG. 4A) and closed position (FIG. 4B)
Figure 4B:

The kick-out means, most preferably, is provided by the frame, although it alternatively can be carried by the sliding pane, particularly in those embodiments in which the fixed pins extend from the frame. A first preferred embodiment of kick-out means provided by the frame for engaging fixed members such as the guide pins shown in FIG. 3, is illustrated in FIGS. 4A and 4B. Specifically, the kick-out means is seen to comprise pivoting cams mounted for arcuate movement in a plane substantially perpendicular to the sliding pane. Left-side upper cam 70 is mounted on pivot pin 72, and right-side upper cam 71 is similarly mounted on pivot pin 73. A corresponding pair of pivoting cams would be mounted to the frame at the bottom of the sliding pane. Each such cam is seen to provide a notch. Specifically, cam surface 74 of left-side cam 70 provides notch 76 to engage guide pin 54 of the sliding pane. Cam surface 75 of the right-side cam 71 provides notch 77 to engage guide pin 55. In FIG. 4A, sliding pane 32 has been moved out of its closed) position and, therefore, is in an offset, parallel plane. As it is moved to the right, that is, toward its closed position, guide pin 54 will be captured by cam notch 76, and guide pin 55 will be captured by cam notch 77. At that point, the perimeter edge surfaces of the sliding pane preferably will have just cleared their overlap with the adjacent fixed-position pane. Further movement of the sliding pane toward its closed position will require counterclockwise rotation (as viewed in FIGS. 4A and 4B) of the cams, thereby forcing the guide pins outward. As seen in FIG. 4B, when the sliding pane has been moved fully to the right, the cams have acted upon the guide pins to cause the sliding pane to simultaneously have been moved outward to a plane flush with the adjacent fixed-position panes.

Figure 5:
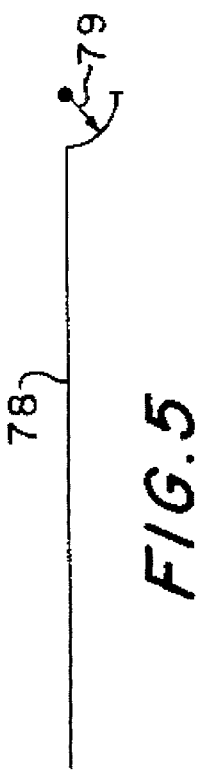
FIG. 5 shows the path of travel followed by the sliding pane of FIGS. 4A and 4B as it moves between its open and closed positions.

This operation is performed in reverse upon initial movement of the sliding pane from its closed position toward its open position. Such "initial movement" of the sliding pane from its closed position, typically will involve a distance of at least the first few inches of travel. Preferably, the kick-out means engages the fixed members, causing offsetting motion of the sliding pane simultaneously with lateral sliding motion, for a distance of lateral travel at least equal to the offset distance. The offset distance is the distance between the flush pane occupied by the sliding pane in its closed position, and the parallel plane occupied by the sliding pane in its open position. The rate of kick-out or offset would thus not be substantially greater than about one-to-one, defined as the ratio of offset travel distance to lateral travel distance. The path of travel 78 for the embodiment of FIGS. 4A, 4B is shown in FIG. 5. Travel path 78 includes an initial portion having a radius 79, controlled by the action of the pivoting cams.

It should be understood that the guide pins of sliding pane 32 in the preferred embodiment of FIGS. 4A and 4B, preferably are controlled not only by engagement with the pivoting cams during initial movement from the closed position, but at all times also by guide channels provided in the frame, dimensioned to closely fit the size of the guide pins, with tolerances suitable to permit smooth sliding. In this way, the sliding pane is not permitted free movement at any point along its path of travel between its open and closed positions. This is particularly significant for avoiding window rattle and the like, which is generally unacceptable in modern motor vehicles.

In an alternative embodiment illustrated in FIGS. 6A and 6B, the kick-out means comprises guide ramps 80 and 81 (and corresponding lower guide ramps) to engage guide pins 54 and 55, respectively. More specifically, guide ramp 80 provides ramp surface 82 which engages guide pin 54 substantially simultaneously as ramp surface 83 of guide ramp 81 engages guide pin 55 at the opposite side of sliding pane 32. Thus, as the sliding pane 32 is moved from its partially open position shown in FIG. 6A to its closed position shown in FIG. 6B, it is forced outwardly to a plane flush with the adjacent fixed-position panes 16 and 24 by interaction of the guide ramps with the guide pins. It can be seen that in this embodiment the sliding pane would have approximately a one-to-one rate of offset during its initial movement from its closed position. The rate of offset could, of course, be adjusted by changing the angle of the guide surfaces 82 and 83 relative the plane of the sliding pane. It is significant that in the embodiment of FIGS. 6A and 6B, as in the embodiment of FIGS. 4A and 4B, the kick-out means maintains engagement with the fixed members, i.e., the guide pins, when the sliding pane is fully in its closed position, to help resist window rattle and the like. FIG. 7 shows the path of travel 84, including initial portion 85, for the sliding pane 32 in the embodiment of FIGS. 6A and 6B.

Kick-out means in the form of guide ramps, preferably are provided as portions of guide channels formed in the upper and lower frame members, as in the embodiment shown in FIGS. 8A and 8B. A left-side upper guide channel 86 is shown to incorporate ramp surface 88 and right-side upper guide channel 87 correspondingly incorporates ramp surface 89. Like guide channels would, of course, be provided in the lower horizontal portion of the frame. Guide pin receiving sockets 90 and 92 are provided at the ends of ramp surfaces 88 and 89, respectively. The guide pins merely seat into such sockets as the sliding pane reaches its closed position, as seen in FIG. 8B. The sockets are dimensioned to permit essentially no inward offsetting travel except simultaneously with lateral travel as the sliding pane is moved toward its open position.

In this regard, it is optional that both vertical edges of the sliding pane be offset substantially symmetrically and simultaneously during initial movement of the sliding pane from its closed position. Thus, in the embodiments shown in FIGS. 4A, 4B, 6A, 6B, and 8A, 8B, opposite vertical edges 36 and 37 of the sliding pane each follows the same path of travel. Alternatively, however, it is possible to aggressively offset only the leading edge of the sliding pane (i.e., left edge 36, as viewed in FIGS. 4A and 4B) upon initial lateral travel, allowing the trailing edge (i.e., opposite edge 37) to follow a less aggressive path of travel. That is, the trailing edge would be more gradually offset in the sense of being offset a shorter distance per unit of lateral travel distance. FIG. 8C shows a pin and guide channel arrangement which is a modification of that seen in FIGS. 8A, 8B. In FIG. 8C the leading edge follows a more aggressive offset than does the trailing edge. Left-side upper guide channel 186 receiving upper pin 54 is substantially the same as channel 86 in FIGS. 8A, 8B. Right-side upper guide channel 187, however, offsets more gradually. Advantageously in this embodiment, when the sliding pane is in its closed position, the upper and lower guide pins at the trailing edge are provided enhanced support by the guide channel wall against inward force. Guide channel 187 is seen to extend behind channel 186, as discussed further below.

In the embodiment illustrated in FIGS. 8A and 8B, the sliding pane could not be moved leftward to entirely clear the center opening, since guide channel 87 must stop at the point where guide channel 86 begins. Thus, guide channel 55 cannot be moved sufficiently to the left to place the sliding pane fully behind fixed pane 16. A slightly different alternative embodiment is illustrated in FIGS. 9A and 9B, wherein guide pins of different lengths are used with guide channels of correspondingly different depths to facilitate sliding the center pane completely behind fixed-position pane 16 to fully open the window. FIGS. 9A and 9B show the lower guide pins on sliding pane 32. Left guide pin 94 is received in left guide channel 98, formed in a lower horizontal guide channel bracket 100, which would be affixed to, and be a part of, a lower horizontal portion of the window assembly frame. Right-side guide pin 95 is longer than pin 94 and is received in right-side guide channel 99, which is correspondingly deeper than left guide channel 98. The left guide channel 98 has a main laterally-extending portion 102, which terminates in an offset "ramp surface" portion 104, formed as a unitary extension. In this regard, the embodiment of FIGS. 9A and 9B is similar to that of FIGS. 6A and 6B and FIGS. 8A and 8B. Right-side guide channel 99 similarly has a main laterally-extending portion 106 which terminates in an offset "ramp surface" portion 108. The action of ramp surface 108 on guide pin 95, along with the action of ramp surface 104 on guide pin 94, will bring sliding pane 32 outwardly to a plane flush with the adjacent fixed panes as the sliding pane reaches its closed position. Sliding pane 32 can be fully opened, however, since guide channel 98 does not terminate at the point where guide channel 99 begins. Rather, it extends in common with guide channel 99. No risk is created that guide pin 95 will accidentally enter the main lateral portion 102 of guide channel 98, because it cannot pass step 110. That is, guide pin 95 is too long to enter guide ramp 98. Optionally, guide ramp 98 in addition to being less deep than guide ramp 99, also can be wider or more narrow. If wider, a pin fitting 96 can be provided on guide pin 94 to prevent window rattle and the like. Also, a ramped or funneled opening can be provided at the end of guide channel 98 to facilitate reentry of guide pin 94 as it passes step 110 during closure of the sliding pane.

It should be recognized, that the embodiment illustrated in FIG. 8C permits full opening of the sliding pane also, without the dual-depth channels of the embodiment of FIGS. 9A, 9B. In the embodiment of FIG. 8C, as mentioned above, the right-side channel 187 is moved inwardly and extends behind (i.e., inside of) left-side channel 186. This may require a wider frame member, at least in the area where the channels overlap. The sliding pane in its open position may be slightly angled to the fixed position pane (although still substantially parallel to it) as a result of channel 187 being extended behind channel 186. Alternatively, channel 187 can simply be offset inwardly along its entire length. The guide pins travelling in channel 187 and the corresponding lower channel in that case preferably are offset inwardly also. While a somewhat thicker frame and a somewhat thicker sliding pane subassembly may be required to accommodate such arrangement, full lateral travel can be achieved with the sliding pane parallel to the adjacent fixed pane in both its open and closed positions.

In preferred embodiments the flush-closing multi-pane window assembly further comprises drive means. In the preferred embodiment illustrated in FIGS. 10 and 11, the drive means comprises an electric motor 120 which is operatively connected to the electrical system of the motor vehicle, preferably through an on/off switch manually controllable from the passenger compartment. The output shaft of the electric motor reversibly drives a cable and drum subassembly comprising a drive drum 122, and a drive cable 124. The drive drum preferably is mounted directly on and coaxial with the output shaft of the electric motor, as in the embodiment of FIG. 10. Alternatively, drive power from the electric motor can be transmitted to the drive drum via suitable linkage means in accordance with techniques well known to those skilled in the art.

In accordance with certain particularly preferred embodiments, the power drive means comprises a sensor to detect an obstruction encountered by the sliding pane as it moves toward its closed position. Upon detecting an obstruction, the electric motor reverses its drive direction to open the window. Such sensor can be provided as an electronic sensor incorporated into the electric motor to monitor the motor's amperage draw. In the preferred pull/pull cable arrangement there is constant load on the motor in both directions (i.e., opening and closing). Hence, a sensor and associated actuator can be set to reverse motor direction upon detecting amperage draw exceeding a preselected limit, e.g. plus or minus 0.5 amps from a 2.0 amp design value.

Figure 10:
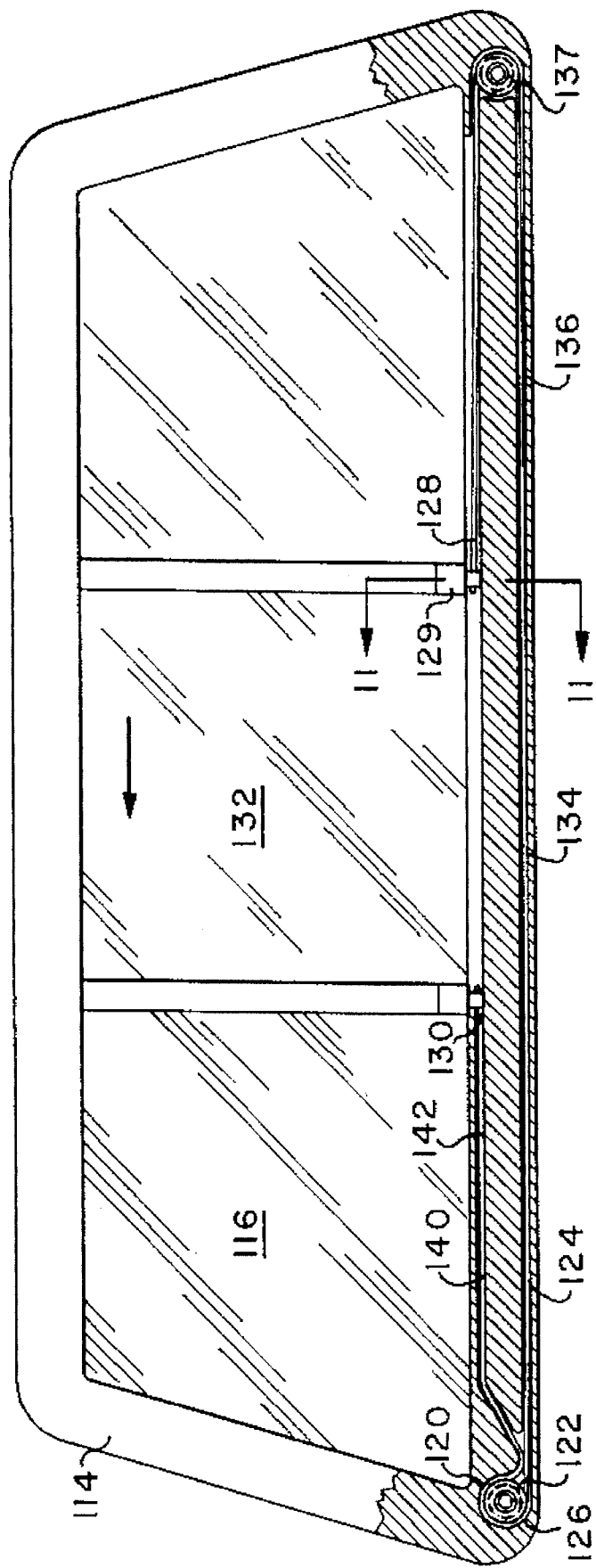
FIG. 10 is a schematic elevation view, partially in section, illustrating electric motor and pull/pull cable drive means for the sliding pane in accordance with one preferred embodiment.

In the embodiment of FIG. 10, electric motor 120 and drive drum 122 are mounted in a cylindrical recess 126 in frame 114 of the window assembly. Drive cable 124 is reversibly driven by rotation of the drive drum. A first cable end 128 is attached to the bottom of sliding pane 132 for pulling it to its closed position upon clockwise rotation (as viewed in FIG. 10) of drive drum 122. The opposite end 130 of drive cable 124 is connected to the opposite lower corner of sliding pane 132, such that counterclockwise rotation of drive drum 122 pulls sliding pane 132 to its open position behind adjacent fixed pane 116. To provide smoother and more reliable operation, cable ends 128 and 130 preferably are connected to their respective points on sliding pane 132 by means of spring-buffered attachments.

In accordance with a particularly advantageous aspect of the embodiment of FIG. 10, the opposite ends of the pull/pull drive cable 124 extend from drive drum 122 within parallel cable channels formed within the lower horizontal portion of frame 114. Thus, portion 134 of drive cable 124, which pulls sliding pane 132 to its closed position, travels in cable channel 136 to an idler pulley 137 mounted in a cylindrical recess in frame 114 remote from the drive drum mounting recess 126. Cable portion 134 then extends to cable end 128 affixed to attachment block 129 on the inside surface 138 of sliding pane 132. Parallel cable channel 140 carries the opposite end 142 of cable 124, which pulls sliding pane 132 to its open position behind fixed pane 116. For ease of assembly, maintenance and repair, the parallel cable channels and mounting recesses preferably are covered or even cooperatively formed in the frame by means of a cover plate 146 along the horizontally-extending lower portion of frame 114, as best seen in FIG. 11. Removable attachment pin 144 is seen in FIG. 11 to pass through attachment block 129 for connection to cable end 128.

In light of the foregoing disclosure of the invention and description of certain preferred embodiments, those who are skilled in this area of technology will readily understand that various modifications and adaptations can be made without departing from the true scope and spirit of the invention. All such modifications and adaptations are intended to be covered by the following claims.

I claim:

1. A flush-closing multi-pane window assembly for a motor vehicle having a body enclosing a passenger compartment, the window assembly comprising, in combination:
   frame means for mounting in a window recess in the vehicle body, comprising a structurally self-supporting, full-circumference, molded plastic, unitary frame member;
   at least one fixed-position pane mounted to the unitary frame member, having an inside surface facing into the passenger compartment, an outside surface and a perimeter edge surface;
   at least one sliding pane having an inside surface facing into the passenger compartment, an outside surface and a perimeter edge surface, mounted to the frame means for sliding between
      a closed position in a first plane in which its outside surface is substantially flush with the outside surface of the fixed-position pane, and
      an open position in an offset second plane substantially parallel to the first plane, substantially overlapping the fixed-position pane; and
      guide means for guiding the sliding pane as it moves in a path of travel between its open and closed positions, the guide means comprising kick-out means to forcibly guide the sliding pane from the first plane toward the second plane substantially simultaneously with initial lateral movement of the sliding pane from its closed position toward its open position.

2. A flush-closing multi-pane window assembly for a motor vehicle having a body enclosing a passenger compartment, the window assembly comprising, in combination:
   frame means for mounting in a window recess in the vehicle body, comprising a structurally self-supporting, full-circumference, molded plastic, unitary frame member;
   at least one fixed-position pane mounted to the unitary frame member, having an inside surface facing into the passenger compartment, an outside surface and a perimeter edge surface;
   at least one sliding pane having an inside surface facing into the passenger compartment, an outside surface and a perimeter edge surface, mounted to the frame means for sliding between
      a closed position in a first plane in which its outside surface is substantially flush with the outside surface of the fixed-position pane, and
      an open position in an offset second plane substantially parallel to the first plane, substantially overlapping the fixed-position pane; and
   guide means for guiding the sliding pane as it moves in a path of travel between its open and closed positions, the guide means comprising
      guide channels extending in the frame means and defining the path of travel,
      fixed members extending from the sliding pane into the guide channels, and
      kick-out means provided by the frame means for engaging the fixed members at least during initial lateral movement of the sliding pane in its path of travel from its closed position toward its open position, to forcibly guide the sliding pane from the first plane toward the second plane substantially simultaneously with said initial lateral movement of the sliding pane from its closed position toward its open position.

3. The flush-closing multi-pane window assembly for a motor vehicle in accordance with claim 2, wherein the window assembly is mounted in a substantially vertical plane, the sliding pane being horizontally slidable and the fixed members comprising at least two pins extending vertically upward from horizontally spaced locations along an upper edge of the sliding pane, and at least two pins extending vertically downward from horizontally spaced locations along a lower edge of the sliding pane.

4. The flush-closing multi-pane window assembly for a motor vehicle in accordance with claim 2, wherein the kick-out means comprises fixed ramp surfaces.

5. The flush-closing multi-pane window assembly for a motor vehicle in accordance with claim 4 wherein the ramp surfaces define, in part, the guide channels.

6. The flush-closing multi-pane window assembly for a motor vehicle in accordance with claim 5 wherein the guide channels, including the ramp surfaces, are molded-in recesses in the unitary frame member.

7. The flush-closing multi-pane window assembly for a motor vehicle in accordance with claim 2 wherein the kick-out means comprises pivoting cams mounted for arcuate movement in a plane substantially perpendicular to the sliding pane while engaging corresponding ones of the fixed members.

8. The flush-closing multi-pane window assembly for a motor vehicle in accordance with claim 2 having first and second fixed-position panes substantially flush with each other, the sliding pane in its closed position being between, and substantially flush with both of, the fixed-position panes.

9. The flush-closing multi-pane window assembly for a motor vehicle in accordance with claim 2 further comprising drive means connected to the sliding pane for moving it between its open and closed position, wherein the drive means comprises an electric motor having a reversibly rotatable output shaft, the electric motor being operatively connected to an electrical system of the motor vehicle through an on/off switch manually controllable from the passenger compartment.

10. The flush-closing multi-pane window assembly for a motor vehicle in accordance with claim 2, further comprising sealing means for providing a substantially weather-tight seal between the sliding pane in its closed position and the fixed-position pane, the sealing means comprising an O-seal extending on the inside surface of the fixed-position pane proximate its peripheral edge adjacent the sliding pane, and a sealing flange extending from the inside surface of the sliding pane outwardly toward the fixed-position pane, having a flange surface seated against and at least partially compressing the O-seal.

11. The flush-closing multi-pane window assembly for a motor vehicle in accordance with claim 2, further comprising an elastomeric, full-circumference blade seal mounted to a full-circumference sealing flange extending from the inside surface of the sliding pane.

12. The flush-closing multi-pane window assembly for a motor vehicle in accordance with claim 2 wherein the outer surface of the fixed-position pane is substantially flush with the vehicle body surrounding the window recess, the outside surface and perimeter edge surface of the fixed-position pane being outward of the unitary frame member and free of surface bonding to the unitary frame member.

13. A flush-closing multi-pane powered backlite for a truck cab enclosing a passenger compartment, comprising, in combination:

frame means comprising a full-circumference molded plastic unitary frame member, for mounting in a recess defining a backlite opening;

laterally spaced first and second fixed-position panes mounted to the frame member and defining between them a window opening, each of the fixed-position panes having an inside surface facing into the passenger compartment, an outside surface and a perimeter edge surface;

a sliding pane having an inside surface facing into the passenger compartment, an outside surface and a perimeter edge surface, mounted to the frame means for lateral sliding between a closed position in a first lateral plane in which (i) its outside surface is substantially flush with the outside surface of the first and second fixed-position panes, and (ii) first and second vertical portions of its perimeter edge are immediately adjacent a vertical portion of the perimeter edge of the first and second fixed-position panes, respectively, and a laterally offset open position in a second plane forward of, and substantially parallel to, the first plane, substantially overlapping the first fixed-position pane; and drive means for moving the sliding pane between its open position and closed position, comprising an electric motor having a reversibly rotatable output shaft and being operatively connected to an electrical system through an on/off switch manually controllable from the passenger compartment.

\* \* \* \* \*